(12) United States Patent
Lynn

(10) Patent No.: US 8,535,410 B1
(45) Date of Patent: Sep. 17, 2013

(54) BLAST FURNACE COOLING METHOD TO INCREASE STEEL PRODUCTION AND REDUCE COST IN A BASIC OXYGEN FURNACE

(76) Inventor: John D. Lynn, Center Valley, PA (US)

( * ) Notice: Subject to any disclaimer, the term of this patent is extended or adjusted under 35 U.S.C. 154(b) by 0 days.

(21) Appl. No.: 13/454,472

(22) Filed: Apr. 24, 2012

(51) Int. Cl.
*C21B 5/06* (2006.01)

(52) U.S. Cl.
USPC .............................................. 75/380; 75/458

(58) Field of Classification Search
USPC .................................................... 75/380, 458
See application file for complete search history.

(56) References Cited

U.S. PATENT DOCUMENTS

| | | | |
|---|---|---|---|
| 6,986,800 B2 * | 1/2006 | Duarte-Escareno et al. | ... 75/458 |
| 6,996,989 B2 * | 2/2006 | Dries et al. | ...... 60/650 |
| 7,531,046 B2 | 5/2009 | Lynn | |
| 2010/0077888 A1 | 4/2010 | Lynn | |

FOREIGN PATENT DOCUMENTS

JP          05125412 A   *   5/1993

OTHER PUBLICATIONS

NPL: machine translation of JP 05-125412 A, May, 1993.*

* cited by examiner

*Primary Examiner* — Jie Yang
(74) *Attorney, Agent, or Firm* — Harold I. Masteller, Jr.

(57) ABSTRACT

The present invention is directed to a process for injecting iron oxide particles into a blast furnace through a pulverized coal injection (PCI) system, the injected particles causing a reduction in hot metal temperature, the injection process continuing and maintaining a target cooled hot metal temperature, the target hot metal tapped to provide a cooled hot metal charge in a BOF converter, the cooled hot metal charge decreasing BOF heat time and increasing BOF steel production.

23 Claims, No Drawings

BLAST FURNACE COOLING METHOD TO INCREASE STEEL PRODUCTION AND REDUCE COST IN A BASIC OXYGEN FURNACE

FIELD OF THE INVENTION

The present invention is directed to a method for reducing the temperature of molten iron contained in a blast furnace for the purpose of increasing productivity in a basic oxygen furnace (BOF) converter by decreasing total charging time to increase of the number of BOF heats produced, the molten iron is cooled to a target temperature by injecting iron oxide particles into the molten iron through a pulverized coal injection (PCI) system associated with the blast furnace, the target molten iron temperature provides a cooled molten iron charge delivered to the BOF and the cooled charge creates a reduced temperature hot metal bath within the BOF converter, the reduced temperature bath enables a shortened charge time by eliminating or reducing a need to add a coolant between charging and start blow thereby decreasing total BOF heat time to provide additional BOF heats.

SUMMARY OF THE INVENTION

Accordingly, it is a first object of the present invention is to reduce the temperature of the molten iron contained within a blast furnace by injecting iron oxide particles into the furnace.

It is another object of the present invention is to reduce the temperature of the molten iron contained within the blast furnace by injecting iron oxide particles into the furnace through a pulverized coal injection (PCI) system associated with the blast furnace.

It is still another object of the present invention is to reduce the temperature of molten iron within the blast furnace by injecting iron oxide particles through the PCI system whereby the iron oxide particles are injected into or proximate the molten iron.

Another object of the present invention is to iron oxide particles through a blast furnace PCI system so that the particles add valuable iron units to molten.

Another object of the present invention is to both cool the molten iron product contained within the blast furnace and add valuable iron units to the tapped molten iron product by injecting iron oxide particles through a pulverized coal injection (PCI) system associated with the blast furnace.

Another object of the present invention is to provide an iron oxide coolant having a particle size that does not clog the injection apparatus in a PCI system.

A still further object of the invention is to reduce the temperature of molten iron within the blast furnace so that the tapped molten iron provides a cooled molten iron charge delivered to a BOF converter at a target temperature.

A still further object of the invention is to provide a cooled molten iron charge delivered to a BOF converter at a target temperature that reduces total BOF heat time and increases steel product production by adding BOF heats.

In satisfaction of the foregoing objects and advantages, the present invention injects iron oxide particles from a de-oiled steelmaking sludge into a blast furnace through a pulverized coal injection (PCI) system, the injected particles cause a reduction in molten iron temperature to a target temperature prior to tapping the blast furnace, the injection process is continued and adjusted to maintain the target temperature so that the molten iron is tapped at target temperature to provide a molten iron charge into a BOF converter at the target temperature, the molten iron charge melts scrap metal contained within the BOF converter and provides a molten metal BOF bath at a start blow temperature without adding a coolant between charging and start blow thereby decreasing total BOF heat time and adding BOF heats to increase BOF steel production.

DESCRIPTION OF THE PREFERRED EMBODIMENTS OF THE INVENTION

In an integrated steelmaking facility, the hot metal manufacturing process begins with smelting in a blast furnace where raw materials, collectively called stock, are continuously supplied through the top or bell of the furnace. A hot blast of air is delivered to the furnace through a bustle pipe and the blast of hot air is blown into the stock through an arrangement of tuyeres that encircle the bottom chamber area of the bosh. The hot blast causes chemical reactions throughout the furnace as the stock moves downward through the furnace toward the slag and iron notches where molten slag and molten iron (hot metal) are separately tapped for downstream processing. The temperature of hot metal tapped from a blast furnace is about 3,000° F. (1,649° C.), substantially equivalent to the end point temperature of molten steel poured from a BOF converter.

The tapped hot metal is delivered to a steelmaking shop where a BOF converter is first charged with scrap steel followed by charging with the hot metal from the blast furnace. In addition to adding iron units to a BOF heat, the scrap metal provides a buffer against refractory lining erosion when the hot metal from the blast furnace is charged into the converter. The incoming hot metal charge melts the scrap metal on contact and the thermodynamic process that melts the scrap provides a coolant within the BOF converter that reduces the incoming hot metal charge by about 630° F. (332° C.) to a cooled hot metal temperature of about 2,370° F. (1,300° C.).

The target end point temperature for a BOF bath (molten slag and molten steel) after the refining process is completed is about 3,000° F. (1,649° C.). The thermodynamics related to oxygen blowing that reduces the carbon level in the steel increases the bath temperature by about 700° F. (370° C.). Therefore, the oxygen blow will increase bath temperature above the target 3,000° F. (1,649° C.) end point temperature. For this reason, following the hot metal charge, additional coolant in the form of iron ore/pellets is charged into the BOF converter to adjust the start blow temperature to achieve the target end point temperature. A BOF refining operation typically requires about 70° F. (21° C.) of additional cooling in the form of iron ore/pellets prior to start blow in order to meet the target end point temperature. Such additional iron ore/pellet cooling increases raw material costs and reduces steel production.

It takes approximately 30 minutes to produce a heat of steel in a BOF converter. In a multiple converter shop the vessels are sequentially operated producing about 48 heats per day or 17,520 heats per year. The average blow time required to reduce the carbon level in the steel is between 15-20 minutes leaving a 10-15 minute window for charging the converter and for pouring the molten slag and steel at turndown. If converter charging can be reduced by just one to two minutes, the production rate in a BOF operation is significantly improved. For example, a one minute reduction in charge time would provide an increase of 1.7 heats per day in the above exemplary 48 heat per day shop, while a two minute reduction in the same shop will provide an additional 3.4 heats per day. Assuming the shop example operates with 300 Ton (272,109 Kilograms) converters, a one to two minute charge reduction time will increase BOF production by between about 186,150 to 372,300 tons (168,843,537 to 337,687,075 Kilograms) of steel per year.

Accordingly, if a steelmaking operation is able deliver a cooled hot metal charge to the BOF at an effective temperature that will achieve target end point temperature without adding an iron ore/pellet coolant, the charge time can be reduced. Such a reduced charge time will enable an earlier start blow time which will increase BOF steel production and reduces raw material costs as heretofore mentioned above.

It has been discovered that if iron oxide particles are fed through the pulverized coal injection (PCI) system in a blast furnace, the particles can be injected either directly into the molten iron or proximate the pooled molten iron. Such injected iron oxide particles cause two thermodynamic reactions. First, the injected particles deliver a new iron source to the smelting process, the injected particles being reduced from iron oxide to iron metal, and second, the heat transfer of reduction provides a coolant in the blast furnace that lowers the pooled molten iron temperature by about 70-100° F. (21-38° C.) to provide a cooled molten iron charge delivered to a BOF converter at a target temperature of about 2,930-2,900° F. (1,610-1,593° C.). When the cooled molten iron is charged into a BOF converter, the molten iron charge causes a heat transfer that melts the scrap metal in the BOF converter and reduces the BOF bath temperature by about 630° F. (332° C.). The hot metal temperature reduction provides a start blow temperature of between about 2,300° F. and 2,270° F. (1,260° C. and 1,243° C.) that prevents exceeding a target end temperature when the oxygen blow is completed.

The hot metal temperature is monitored and the iron oxide particles are either continuously or intermittently injected into the blast furnace at either a constant or adjusted injection rate to maintain target molten iron temperature in the blast furnace. The target hot metal is tapped at between about 2,930-2,900 (1,610-1,593° C.) and is delivered to a BOF converter as a cooled hot metal charge. The cooled hot metal charge reduces the time period for a BOF heat, the reduced operating time increasing steel production as heretofore mentioned above.

Iron oxide particles are entrained, and are readily available, within waste streams generated during steelmaking operations. Such iron oxide particles can be recovered from the waste streams for recycling as disclosed in U.S. Pat. No. 7,531,046 granted to John D. Lynn on May 12, 2009 and incorporated herein by reference in its entirety. Recovered iron oxide particles provide valuable iron units at a cost base below the iron ore sold on the commodity market, and the recovery process reduces steelmaking environmental issues and landfilling costs. Iron oxide particles recovered from steelmaking waste streams are suitable for use in the present method as a coolant injected into a blast furnace through PCI apparatus. The iron oxide coolant feed into PCI apparatus may comprise a variety of different particle sizes but the particle size must be about 1.00 inch (2.54 cm) or smaller to prevent clogging within the PCI system. A preferred particle size may be provided by screening and/or grinding, crushing or the like to an iron oxide particle size of 0.25 inch (0.64 cm) or smaller.

A preferred source of recovered iron oxide particles is found in hot strip mill (HSM) sludge, after de-oiling as taught by Lynn in U.S. Pat. No. 7,531,046. The HSM particles are preferred because the waste stream from the rolling mill does not contain heavy metal particles that would cause environmental issues if recycled into a blast furnace. The recovered HSM iron oxide is also preferred because it is in the form of finely sized particles that measure 100 mesh and smaller.

Such HSM iron oxide particles are extremely valuable reverts for recycling back into the steelmaking process. Initially, it was thought that the particles were suited for use as a coolant or iron source in a BOF converter. However, during actual reduction to practice, when charged into a BOF the particles were blown out of the converter and caused an environmental dusting problem within the steelmaking shop. Such blow out problems do not occur when the iron oxide particles are injected into a blast furnace through a PCI system. The downward moving stock prevents particle blow out and the iron oxide is quickly reduced to molten iron before any dust like blow out can occur.

Recovered HSM particles can be sent directly from recovery operations to the blast furnace as a coolant feed through the PCI system, or the particles can be further processed a sinter plant and/or balling operation prior to being used as a blast furnace coolant.

As such, the present invention has been disclosed in terms of a preferred embodiment that fulfill each one of the objects set forth above, and the invention provides a new and improved method for reducing molten iron temperature in a blast furnace by injecting iron oxide particles into the furnace through a PCI system. The reduced molten iron is tapped at the reduced temperature and delivered to a BOF converter as a cooled hot metal charge that reduces total heat time, increases steel production, and eliminates or reduces a need to add iron ore/pellets as a coolant to the BOF converter. It should be understood that the temperature, weight and time values disclosed in the preferred embodiment of the invention are only exemplary and not absolute because such values will change between different steelmaking operations. And of course, those skilled in the art may contemplate various changes, modifications, and alterations from the teachings of the present disclosure without departing from the intended spirit and scope of the present invention.

I claim:

1. A process for reducing molten iron to a target temperature prior to tapping to provide a molten iron charge into a basic oxygen furnace at said target temperature, said molten iron charge reducing basic oxygen furnace charging time and thereby increasing a number of basic oxygen furnace heats produced in a steelmaking operation, the steps of the process comprising:
   a) providing iron oxide particles recovered from a de-oiled steelmaking sludge, said iron oxide having a particle size suitable for use in a pulverized coal injection system associated with the blast furnace;
   b) injecting said iron oxide particles into the blast furnace through said pulverized coal injection system, said injected particles causing a heat transfer that reduces said molten iron to said target temperature prior to tapping;
   c) monitoring said molten iron temperature and adjusting an iron oxide injection rate to maintain said molten iron at said target temperature;
   d) tapping said molten iron at said target temperature; and
   e) charging said tapped molten iron at said target temperature into the basic oxygen furnace, said charged molten iron eliminating a need to charge a coolant into the basic oxygen furnace during charging and thereby reducing a total charging time and increasing said number of basic oxygen furnace heats whereby steel production is increased.

2. The process recited in claim 1 wherein said total charging time is reduced by about one minute or greater.

3. The process recited in claim 1 whereby said iron oxide particles are recovered from a de-oiled hot strip mill steelmaking sludge.

4. The process recited in claim 1 wherein said iron oxide particle size is 1.00 inch (2.54 cm) or smaller.

5. The process recited in claim 1 wherein said iron oxide particle size is 0.25 inch (0.64 cm) or smaller.

6. The process recited in claim 1 wherein said iron oxide particle size is 100 mesh or smaller.

7. The process recited in claim 1 wherein an inert gas provides a carrier for injecting said iron oxide particles through the pulverized coal injection system and into the blast furnace.

8. The process recited in claim 1 wherein said molten iron charge at said target temperature provides a start blow bath temperature after charging into the basic oxygen furnace.

9. A process for operating an integrated steelmaking facility to increase steel product production, the steps of the process comprising:
   a) injecting iron oxide particles recovered from a de-oiled steelmaking sludge through a pulverized coal injection system and into a blast furnace the injected particles causing a heat transfer that reduces molten iron temperature within the blast furnace to a target temperature prior to tapping said molten iron from the blast furnace;
   b) monitoring said molten iron temperature and adjusting a rate of said iron oxide particle injection to maintain said molten iron at said target temperature;
   c) tapping said molten iron at said target temperature from the blast furnace;
   d) delivering said tapped molten iron at said target temperature to a basic oxygen furnace that contains scrap metal;
   e) charging said molten iron at said target temperature into the basic oxygen furnace, the incoming molten iron charge melting the scrap metal and causing a thermodynamic process that provides a molten metal bath within the basic oxygen furnace at a start blow temperature, said start blow temperature decreasing a total charging time and increasing steeling production by adding basic oxygen furnace heats.

10. The process recited in claim 9 wherein said molten metal bath at said start blow temperature eliminates a need to add a coolant to the basic oxygen furnace during said total charging time.

11. The process recited in claim 9 wherein said total charging time is reduced by about one minute or greater.

12. The process recited in claim 9 wherein said iron oxide particles are recovered from a de-oiled hot strip mill steelmaking sludge.

13. The process recited in claim 9 wherein said iron oxide particle size is 1.00 inch (2.54 cm) or smaller.

14. The process recited in claim 9 wherein said iron oxide particle size is 0.25 inch (0.64 cm) or smaller.

15. The process recited in claim 9 wherein said iron oxide particle size is 100 mesh or smaller.

16. The process recited in claim 9 wherein an inert gas provides a carrier for injecting said iron oxide particles through the pulverized coal injection system and into the blast furnace.

17. A process for operating a basic oxygen furnace to increase a number of heats produced by decreasing a total charging time so that steel product production is increased, the steps of the process comprising:
   a) delivering to the basic oxygen furnace a molten iron charge tapped from a blast furnace at a target temperature where said target temperature is provided by injecting iron oxide particles into the blast furnace, said injected iron oxide particles causing a heat transfer that reduces molten iron contained within the blast furnace to said target temperature prior to tapping;
   b) charging scrap metal and said molten iron at said target temperature into the basic oxygen furnace, said molten iron charge causing a thermodynamic process that liquefies the scrap metal, said thermodynamic process providing a molten metal bath within the basic oxygen furnace at a start blow temperature and thereby decreasing a total charging time, providing additional basic oxygen furnace heats and increasing steel production.

18. The process recited in claim 17 wherein said iron oxide particles are recovered from a de-oiled steelmaking sludge.

19. The process recited in claim 17 wherein said iron oxide particles are recovered from a de-oiled hot strip mill steelmaking sludge.

20. The process recited in claim 17 wherein said iron oxide particles are 1.00 inch (2.54 cm) or smaller.

21. The process recited in claim 17 wherein said iron oxide particles are 0.25 inch (0.64 cm) or smaller.

22. The process recited in claim 17 wherein said iron oxide particles are 100 mesh or smaller.

23. The process recited in claim 17 wherein an inert gas provides a carrier for injecting said iron oxide particles through the pulverized coal injection system and into the blast furnace.

* * * * *